(12) United States Patent
De Peuter (10) Patent No.: US 8,743,121 B2
(45) Date of Patent: Jun. 3, 2014

(54) SMART IMPACT VIEWS

(75) Inventor: Geert De Peuter, Turnhout (BE)

(73) Assignee: BMC Software, Inc., Houston, TX (US)

( * ) Notice: Subject to any disclaimer, the term of this patent is extended or adjusted under 35 U.S.C. 154(b) by 651 days.

(21) Appl. No.: 12/646,330

(22) Filed: Dec. 23, 2009

(65) Prior Publication Data

US 2011/0148880 A1    Jun. 23, 2011

(51) Int. Cl.
*G06T 11/20* (2006.01)
(52) U.S. Cl.
USPC .............................. 345/440; 345/619; 715/859
(58) Field of Classification Search
USPC .......................................... 348/180; 715/243
See application file for complete search history.

(56) References Cited

U.S. PATENT DOCUMENTS

| | | | |
|---|---|---|---|
| 6,732,114 B1* | 5/2004 | Aamodt et al. | 715/243 |
| 7,456,840 B2* | 11/2008 | Molesky et al. | 345/581 |
| 7,801,971 B1* | 9/2010 | Amidon et al. | 709/217 |
| 2007/0058043 A1* | 3/2007 | Thukral | 348/180 |
| 2007/0282470 A1* | 12/2007 | Hernandez et al. | 700/90 |
| 2008/0016115 A1* | 1/2008 | Bahl et al. | 707/104.1 |
| 2009/0013216 A1* | 1/2009 | Abrashkevich et al. | 714/46 |
| 2012/0151419 A1* | 6/2012 | Kent et al. | 715/854 |

* cited by examiner

*Primary Examiner* — Phi Hoang (57) ABSTRACT

A technique for allowing collapse or expansion of a multi-node subgraph of a directed acyclic graph is disclosed. The subgraph may be collapsed or expanded with a single user interaction, retaining the important service context information and relations, while minimizing information of lesser importance in the service model.

19 Claims, 12 Drawing Sheets

_(12) United States Patent_

SMART IMPACT VIEWS

BACKGROUND

This disclosure relates generally to the field of management of information technology (IT) services. More particularly, but not by way of limitation, it relates to a technique for improving usability of IT service models.

Business Service Management (BSM) is a methodology of viewing technology infrastructure administration and problem diagnosis from the perspective of its impact on critical business services rather than technology silos. One aspect of BSM is Service Impact Management (SIM), which is the ability to determine, visualize, report, and diagnose the impact of problems reported in technology infrastructure based on the impact these problems impose on business services that utilize the affected pieces of technology infrastructure. SIM implementations often involve service models that model the IT services of the enterprise.

Service models in today's IT environment are typically complex, containing potentially thousands of underlying dependent services. The representation of these services in operation views is typically done using directed acyclic graphs (DAGs), where each service is represented as a node in the graph. From an operational concept, today's event handling methodologies allow customers to limit the amount of false alarms for service impacting events. When there are only a few events in those big service models, however, the visualization aspect may become challenging for the user. On one hand, complex user interface (UI) components can be used to provide as much data as possible about the event so all information is available to the user without requiring too much screen switching. On the other hand, the complexity of the service models makes it difficult to present the most important data given the limited screen display area that is available.

Furthermore, with complex service models, expanding the service graph to display the problem node(s) or collapsing the service graph to remove nodes of no interest is typically done with multiple mouse clicks, expanding one level at a time.

SUMMARY

In one embodiment, a method is disclosed. The method comprises generating a graph in a first computer system, wherein nodes of the graph represent information technology (IT) components of an enterprise; collapsing a multi-node subgraph of the graph; and displaying the graph. The act of collapsing a multi-node subgraph of the graph comprises collapsing nodes of the subgraph that represent IT components that are in a first state; collapsing nodes of the subgraph that meet a first criterion; and associating expansion indicators with nodes in the collapsed subgraph to indicate where the collapsed subgraph may be expanded.

In another embodiment, a computer readable medium is disclosed. The computer readable medium has instructions for a programmable control device stored thereon wherein the instructions cause a programmable control device to perform the method described above.

In another embodiment, a networked computer system is disclosed. The networked computer system comprises a plurality of computers communicatively coupled, at least one of the plurality of computers programmed to perform at least a portion of the method described above wherein the entire method described above is performed collectively by the plurality of computers.

DETAILED DESCRIPTION

In various disclosed embodiments, a technique for allowing collapse or expansion of multi-node subgraphs of a directed acyclic graph is disclosed. Subgraphs may be collapsed or expanded with a single user interaction, retaining the important service context information and relations, while minimizing the temporal "noise" in the service model. Users may collapse or expand critical paths in the service model graph by expanding or collapsing subgraphs, even if the subgraph contains multiple nodes or vertices that meet criteria for remaining visible in the collapsed subgraph.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts are understood to reference all instance of subscripts corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Figure 1:
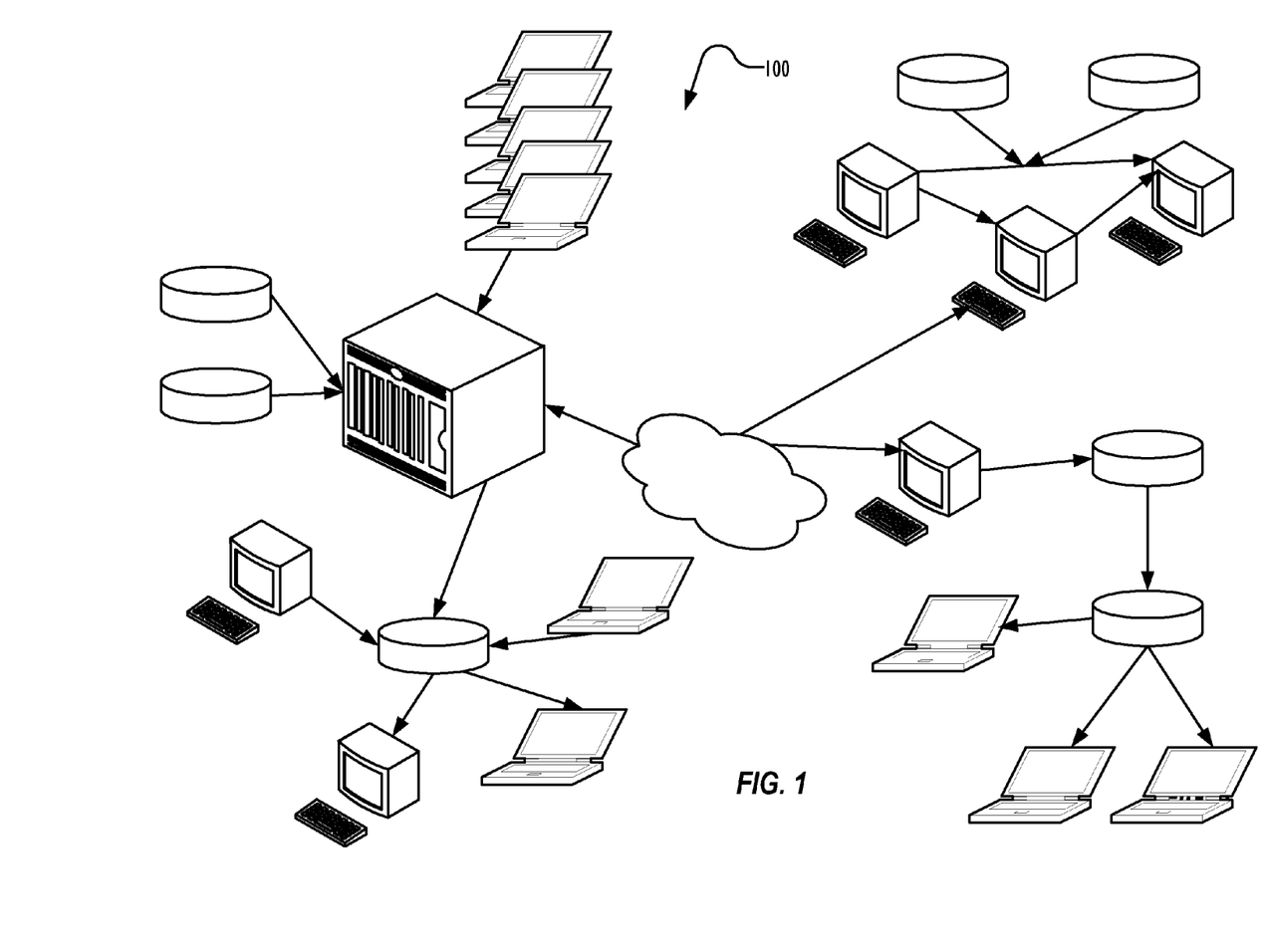
FIG. 1 illustrates, in block diagram form, an example of an enterprise computing environment on which disclosed embodiments may be implemented.

The instant disclosure describes various embodiments for use in SIM or systems management environments. By way of example, not intended to limit the scope of the claimed invention, the instant disclosure describes a particular embodiment of an enterprise computing environment 100 as seen in FIG. 1 where multiple components of information technology (IT) infrastructure are networked together to provide an IT infrastructure supporting a business operation.

A company's success today is integrally linked with its IT services. Any disruptions or degradations in IT service can cause serious, even catastrophic, damage to business. That means that IT professionals are under considerable pressure to ensure that required IT service levels are delivered to users. Considering the complexity and dynamic nature of today's enterprise networks, it can be quite a challenge to achieve the high levels of service users require.

The following is described in term of DAGs but may be used with other types of graphs. Although in the embodiments described below, the graph represents service models for an enterprise SIM or system management environment, the present invention is not so limited, but may be employed in any environment where collapsing and expanding subgraphs of a graph may be desirable.

In many embodiments, the service model is represented visually by a graphical user interface displayed on a display screen, but other techniques for displaying the graph may be employed within the scope of the disclosed embodiments. Each nodes or vertex in the graph may be displayed with as much or as little information as may be considered appropriate for that node, and in some embodiments, selecting the node may cause additional or less information to be displayed, depending on the current state of the display. The format and information displayed for the nodes, as well as for the connectors or edges between nodes is outside of the scope of the present invention. The service model is a directed acyclic graph containing service components. The directed association between service components in the graph defines a relationship between the service components. Service components may represent system components or any logical or physical resource, function, process or service necessary for efficient business operation. A service component may also be referred to simply as a component. In one embodiment, the graph may be generated on one computer system, and displayed on a different computer system. In other embodiments, the graph is generated and displayed on the same computer system.

For clarity, the examples below are illustrated using simple circles, with different conditions indicated by the line pattern of the circle. In the Figures, a circle with a solid line pattern indicates that the node is part of a subgraph in which an event has occurred with a first impact state. A subgraph is a node of a larger graph and a connected subset of nodes and connectors or edges that descend from that node. A circle with a dotted-dash line indicates that the node is part of a subgraph in which an event has occurred with a second impact state. A circle with a dashed line pattern indicates that the node is part of a subgraph in which no impacting event has occurred. In an actual implementation, color may be used instead of line patterns, such as green for nodes in an unimpacted subgraph, red for nodes in a subgraph in which a first impact state event has occurred, and yellow for nodes in a subgraph in which a second impact state event has occurred. Although only three line patterns are used herein, any number of impact states may be provided for in disclosed embodiments as desired, with different visual indications to distinguish between different impact states. In addition, a visual indicator or symbol may be used to indicate that a particular node has an impacting event associated with it. In the Figures, this indicator is a star, but any type of visual indicator may be used as desired, including text, colors, flashing, and other types of visual indicators. Similarly, indicators are described below to indicate that portions of the graph have been collapsed or may be expanded. For clarity, these indicators are illustrated as arrows with different fill patterns, but any form of visual indicator or symbol may be used, including the use of different colors or patterns, as well as text or other forms of indicators.

Although as described herein the indicators are described as visual indicators, non-visual cues may be used instead of or in addition to visual indicators, as desired or convenient.

A typical implementation of a service model graph may include hundreds or thousands of nodes. For clarity, only small numbers of nodes are illustrated in the Figures.

When a service model is used for real time problem analysis, service components in an acceptable or "OK" state are often considered as relatively unimportant in the model, and may be ignored when considering events that have impacted the system represented by the service model. Nevertheless, the end user may desire to display those OK state service components, thus the disclosed techniques in some embodiments may provide indicators that a subgraph with OK state service components has been collapsed into a parent node. In the following discussion, the service components and the nodes representing those service components in the DAG displayable by the UI are discussed interchangeably. A node may generally be considered to be in an OK state if it has no impacting event associated with it, and does not inherit an impacted state from any descendant associated with an impacting event, thus it represents a component that is not affected by any event having an impact on the IT components of the enterprise that are modeled by the service model.

In the example graphs described below, inheritance of events is shown by directed connector lines, with an arrow pointing from the child to the parent node that inherits the event. (In such graphs, the parent inherits from the child.) An actual DAG may have multiple root nodes, i.e., nodes with no parent node, but for clarity, only simple single root graphs are described herein. An actual DAG may also comprise multiple subgraphs that are disconnected, i.e., have no inheritance relationships between any node in one subgraph with any node in another subgraph. For clarity, only simple completely connected graphs are illustrated herein, although any node may be an inheritor of multiple nodes.

In FIGS. 2-10, graphs are shown illustrating service models in both a collapsed and expanded state, with the collapsed graph at the top and the expanded state at the bottom. In some embodiments, the service model graph may be displayed initially in the collapsed state, presenting only the portions of the service model with significance, and allowing a user to expand all or a portion of the service model as desired for further information. In other embodiments, the service model graph may be displayed initially in an expanded state, and the user may collapse portions of the service model as desired. In one embodiment, whether to display the service model initially in the collapsed state or the expanded state is a configurable option.

Figure 2:
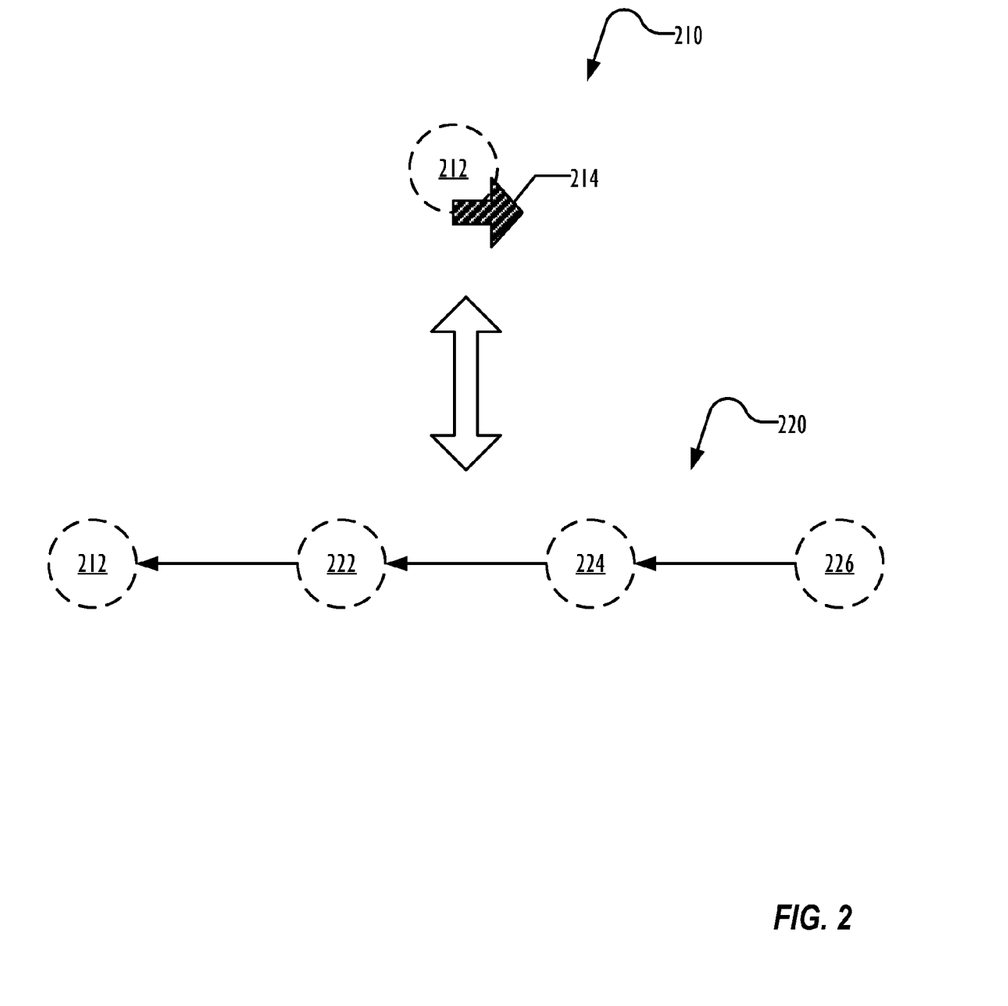
FIGS. 2-10 illustrate, in graph form, examples of expanding and collapsing a graph according to one embodiment.

FIG. 2 is a pair of graphs 210 and 220 illustrating a simple service model according to one embodiment in which all service components are in an OK state. In such a situation, a smart impact view may collapse the entire graph into the root node. Thus, graph 220, with nodes 212, 222, 224, and 226 may be collapsed into root node 212, as illustrated in graph 210. An indicator 214 is associated with root node 212 to indicate that graph 210 has been collapsed and may be expanded by selecting the indicator or some other user interaction associated with node 212. This expansion and collapse can be done with a single user interaction, typically a mouse click, instead of expanding or collapsing the graph 210 node by node as in conventional techniques, which would require multiple user interactions to collapse each of nodes 226, 224, and 222 individually.

In some embodiments, both the smart expansion and collapse techniques described herein as well as conventional node by node collapse and expansion may be performed in the UI, allowing the user full control over the amount of the service model displayed in the UI.

Figure 3:
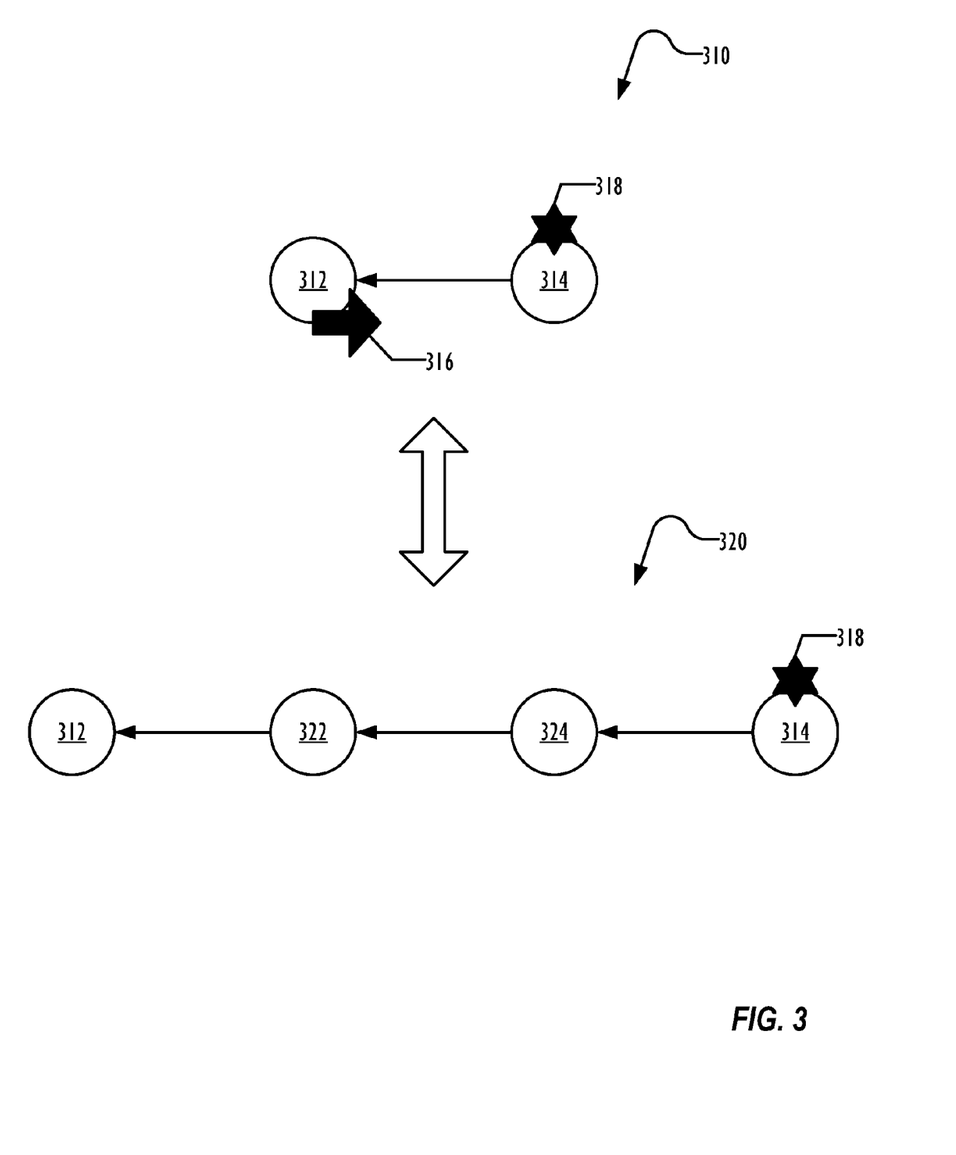

In one embodiment, when a service component has an impacting event and its parent has the same state, and where the child service component is the parent's only child not in an OK state, then the child node can be collapsed into the parent node. FIG. 3 is an example of such a service model.

FIG. 3 is a pair of graphs 310 and 320 according to one embodiment in which the service model has four service components 312, 322, 324, and 314, one of which (314) has an impacting event. Because of conventional state propagation techniques, all of the service components 312, 322, and 324 inherit this state from node 314. The impacting event is indicated in the UI with an indicator 318, here a star.

Graph 310 is a smart view of graph 320, collapsing nodes 322 and 324 into root node 312. Unlike the example of FIG. 2, node 314 is left visible in the collapsed graph, because the service component has an impacting event indicated by the indicator 318. An indicator 316 is associated with the root node 312, indicating that expansion of graph 310 into graph 320 can be performed at node 312 if desired with a single interaction.

Figure 4:
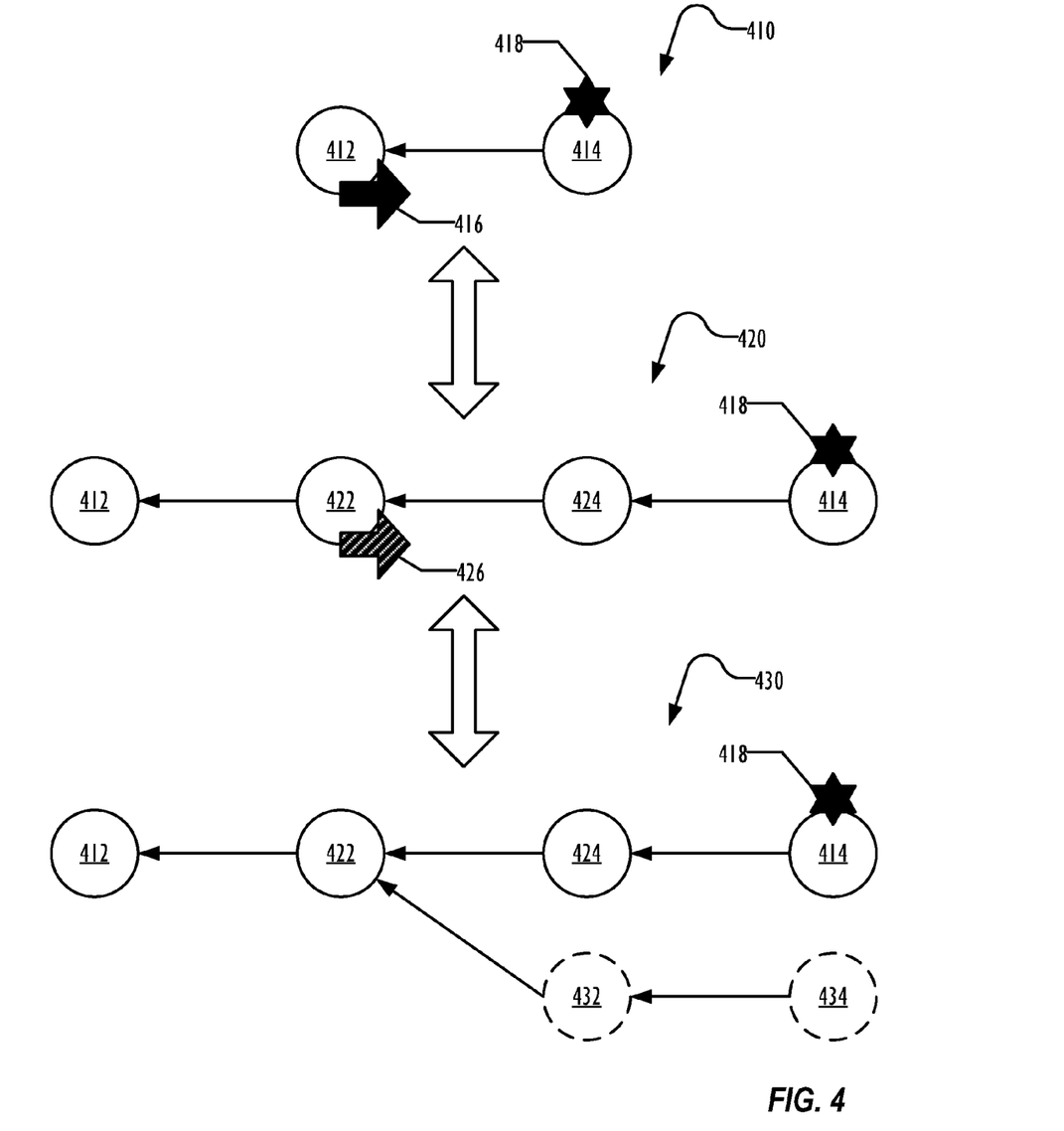

A more complex example according to one embodiment is illustrated in FIG. 4, in which a smart impact view of a service model is illustrated in collapsed graph 410. Node 412 may indicate with expansion indicator 416 that the collapsed graph 410 may be expanded further. Node 414 is a node with an associated impacting event in the service model, indicated by indicator 418.

Upon expansion of the graph 410, the smart view in this example expands to an intermediate graph 420, making additional nodes 422 and 424 visible in the UI. Node 422 is marked with indicator 426, indicating graph 420 may be further expanded into graph 430. As indicated by indicator 426, fully expanded graph 430 includes another subgraph of nodes 432 and 434, which are illustrated as being in the OK state, thus those nodes may be eliminated when collapsing graph 430 to the intermediate graph 420. In some embodiments, no intermediate graphs 420 may be displayable, and expanding graph 410 results in the display of graph 430, without the need for an intermediate step, expanding all subgraphs of graph 430 that were collapsed to form the collapsed graph 410 in a single interaction.

Although node 422 has two subgraphs descending from it, and node 422 has a different state from the nodes of the subgraph comprising nodes 432 and 434, elimination of the subgraph comprising nodes 432 and 434 may be performed because those nodes are in an OK state. As shown below, where a second subgraph comprises nodes with an impacting event, then multiple subgraphs may remain in the collapsed graph as descending from the intersection point of the subgraphs, to avoid hiding information about the multiple impacting events.

Figure 5:
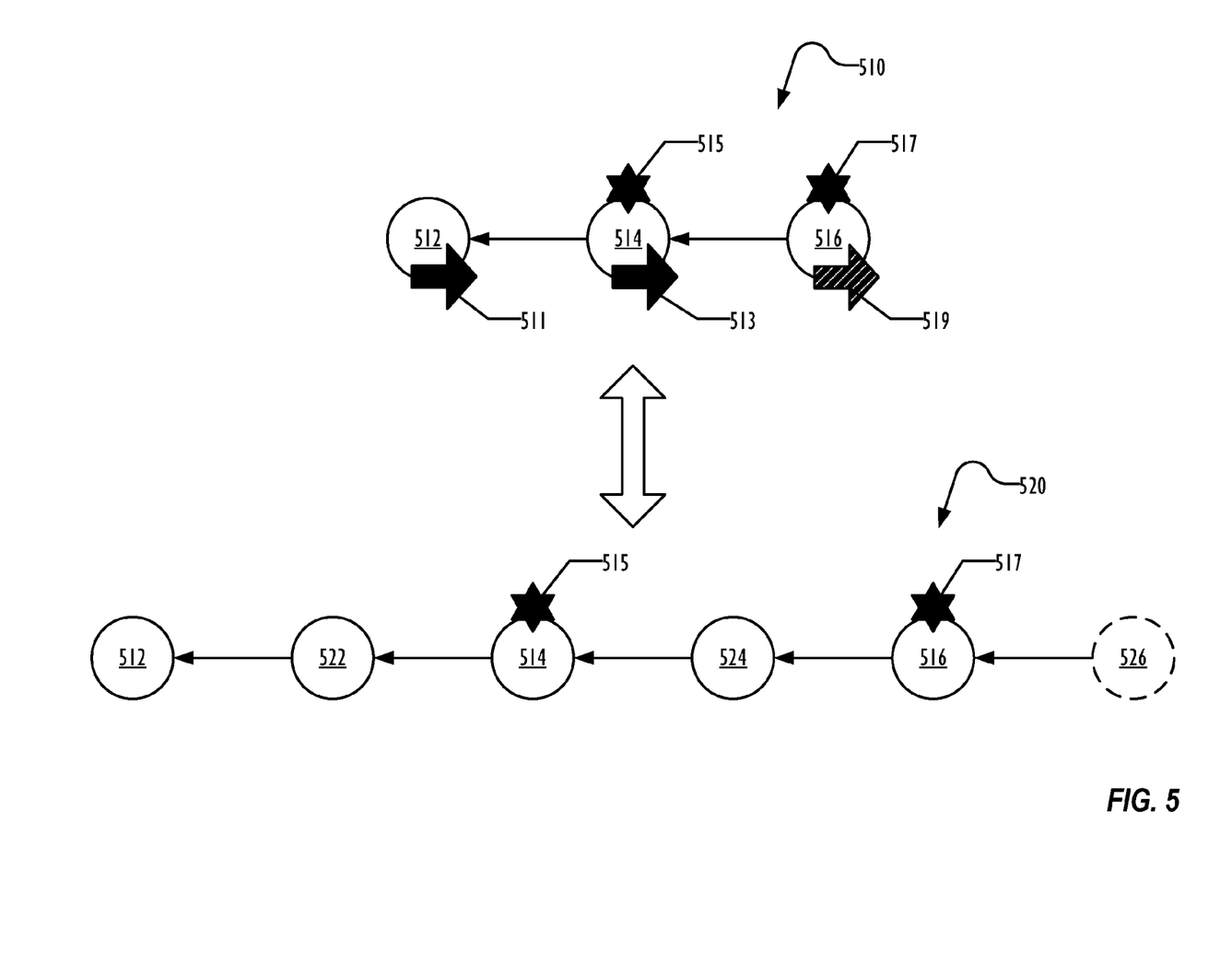

FIG. 5 illustrates another pair of graphs 510 and 520 according to one embodiment. In this example, there are two impacted service components at nodes 514 and 516, descending from root node 512. Instead of collapsing node 516 into node 514, which would hide information about the other impacting event, both nodes remain visible in the graph 510, with separate indicators 515 and 517 indicating that an impacting event is associated with each of the two nodes 514 and 516.

In this example, three collapses are performed from the expanded graph 520 to produce the collapsed graph 510. Node 526, which is in the OK state, is collapsed into node 516, as indicated by indicator 519 of the graph 510. Node 524, the parent node of node 516 and a child of node 514, is collapsed into node 514, as indicated by indicator 513. Node 522, the parent of node 514 and the child of root node 512 is collapsed into root node 512, as indicated by indicator 511. A user of the UI displaying graph 510 may choose to expand any portion of graph 510 by an appropriate UI interaction. So for example, an interaction associated with the indicator 511 would expand graph 510 to show node 522, but would typically leave the rest of graph 510 collapsed. Similarly, an interaction associated with the indicator 513 would make node 524 visible, and an interaction associated with the indicator 519 would make node 526 visible. In some embodiments, the graph 510 may be expanded into the fully expanded graph 520 by a single interaction that directs expansion of all collapsed portions of the graph 510.

Figure 6:
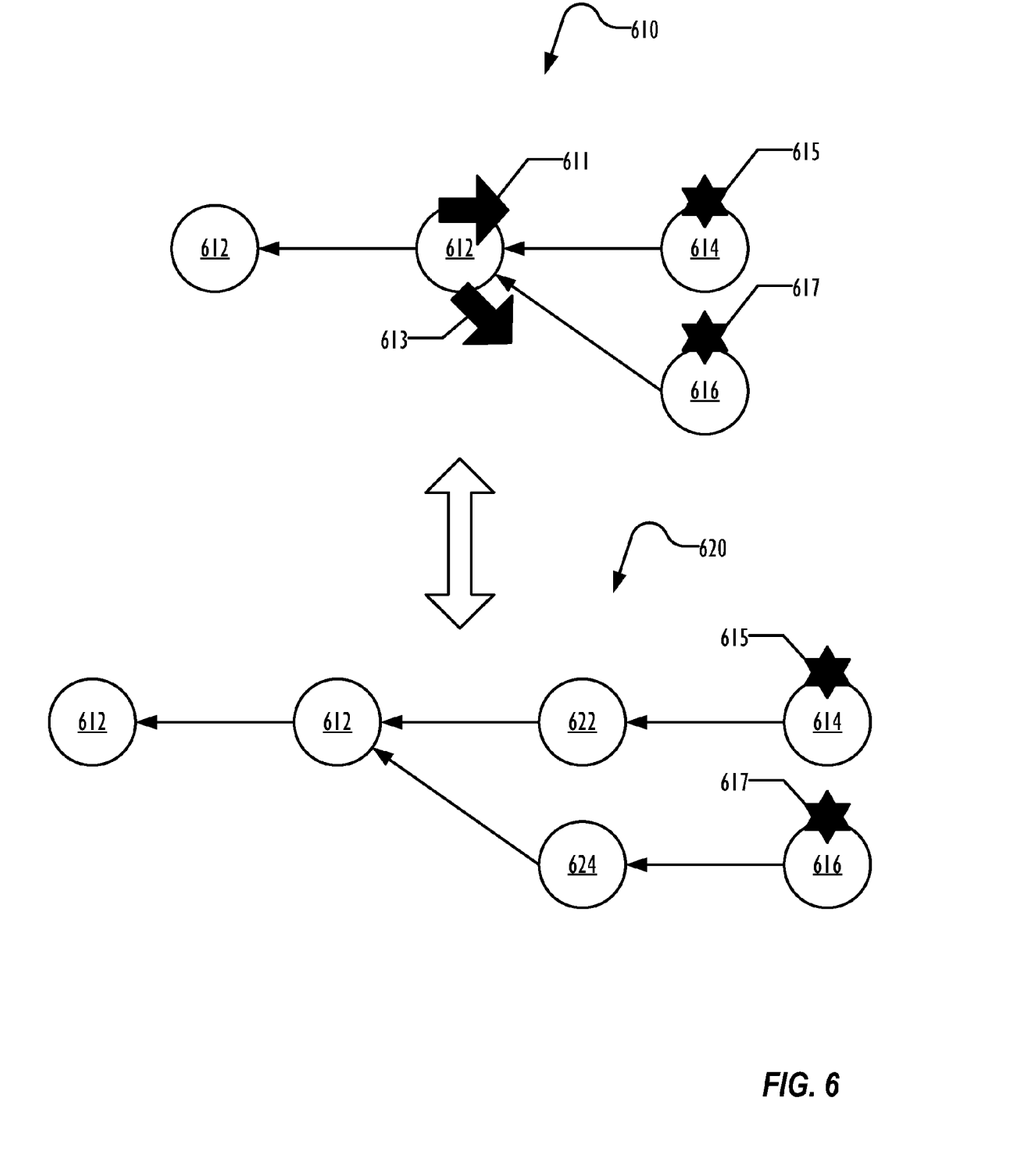

FIG. 6 illustrates another example with a pair of graphs 610 and 620 according to one embodiment. In this example, two subgraphs contain impacting events, indicated by indicators 615 and 617 on nodes 614 and 616, respectively. As illustrated in FIG. 6, these subgraphs are not fully collapsed into node 612, but nodes 614 and 616 remain visible in the collapsed graph 610, to avoid hiding information regarding the impacting events indicated by indicators 615 and 617, because they are nodes that intersect multiple paths through the subgraph to nodes with impacting events.

Nodes 622 and 624, however, do not have impacting events, thus they may be collapsed into node 612, reducing the size of the visible graph. Indicators 611 and 613 indicate that expansion of each of the two subgraphs may be performed as desired.

Figure 7:
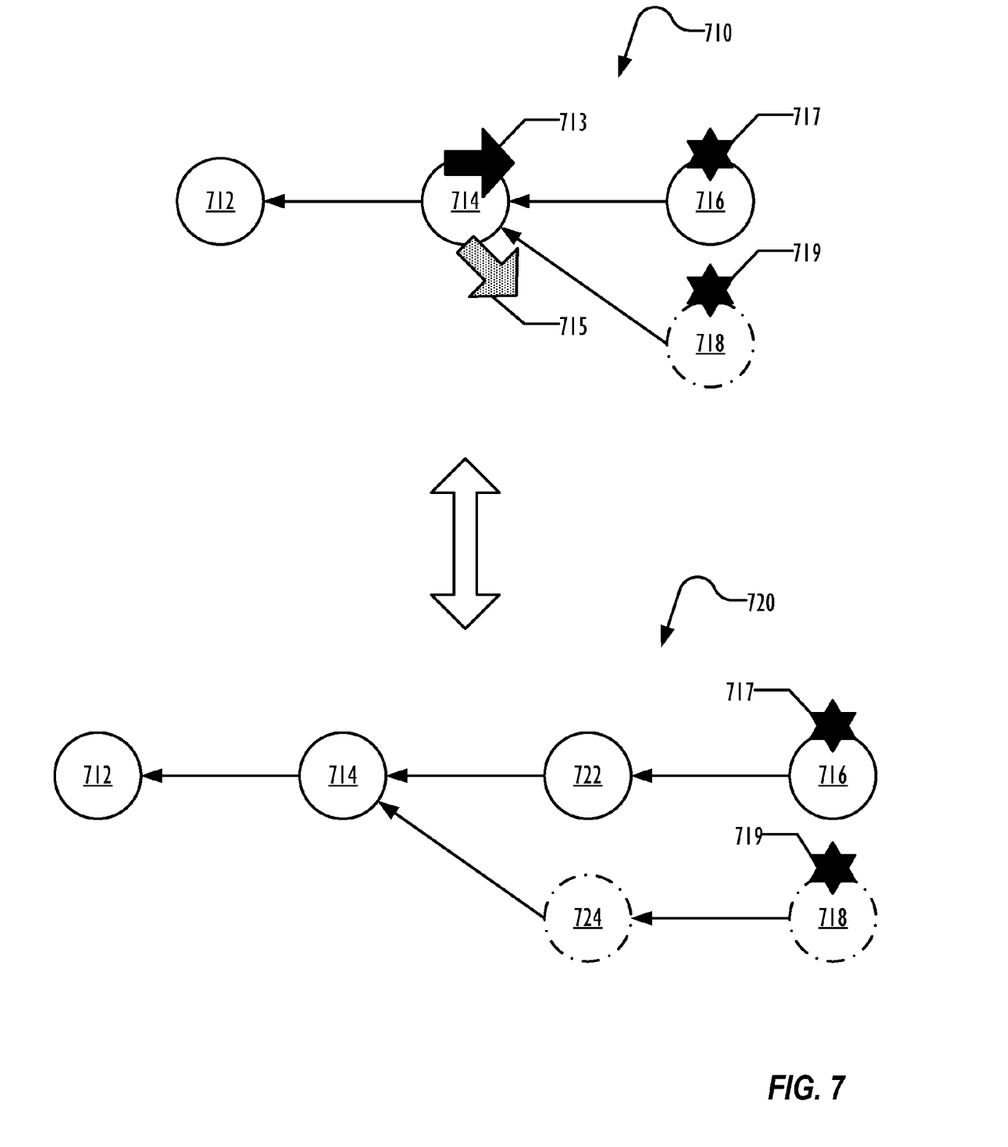

FIG. 7 illustrates according to one embodiment another example similar to that of FIG. 6, but where the impacting events indicated by indicators 717 and 719 are different, as indicated by the line pattern of node 718 and the fill pattern of indicator 715. As before, nodes 722 and 724 are collapsed in FIG. 710 into their common parent node 714. In embodiments where different impacting events are ranked, the parent node 714 may be modeled in the graph to indicate the state of the higher-ranked state propagated from its child nodes with impacting events. In the example of FIG. 7, the impacting event illustrated by indicator 717 is higher ranked than the impacting event illustrated by indicator 719, thus node 714 may be illustrated with the state of node 716, which it inherits through conventional state propagation techniques.

The expansion indicators 713 and 715 may be different, indicating that the collapsed subgraph contains nodes of different states. As illustrated in herein, impacting event indicators are all illustrated with a common indicator. In one embodiment, the impacting event indicator may have different visual characteristics, depending on the impacting event. In another embodiments, different impacting event indicators may share a common visual indication, regardless of the impacting event.

Figure 8:
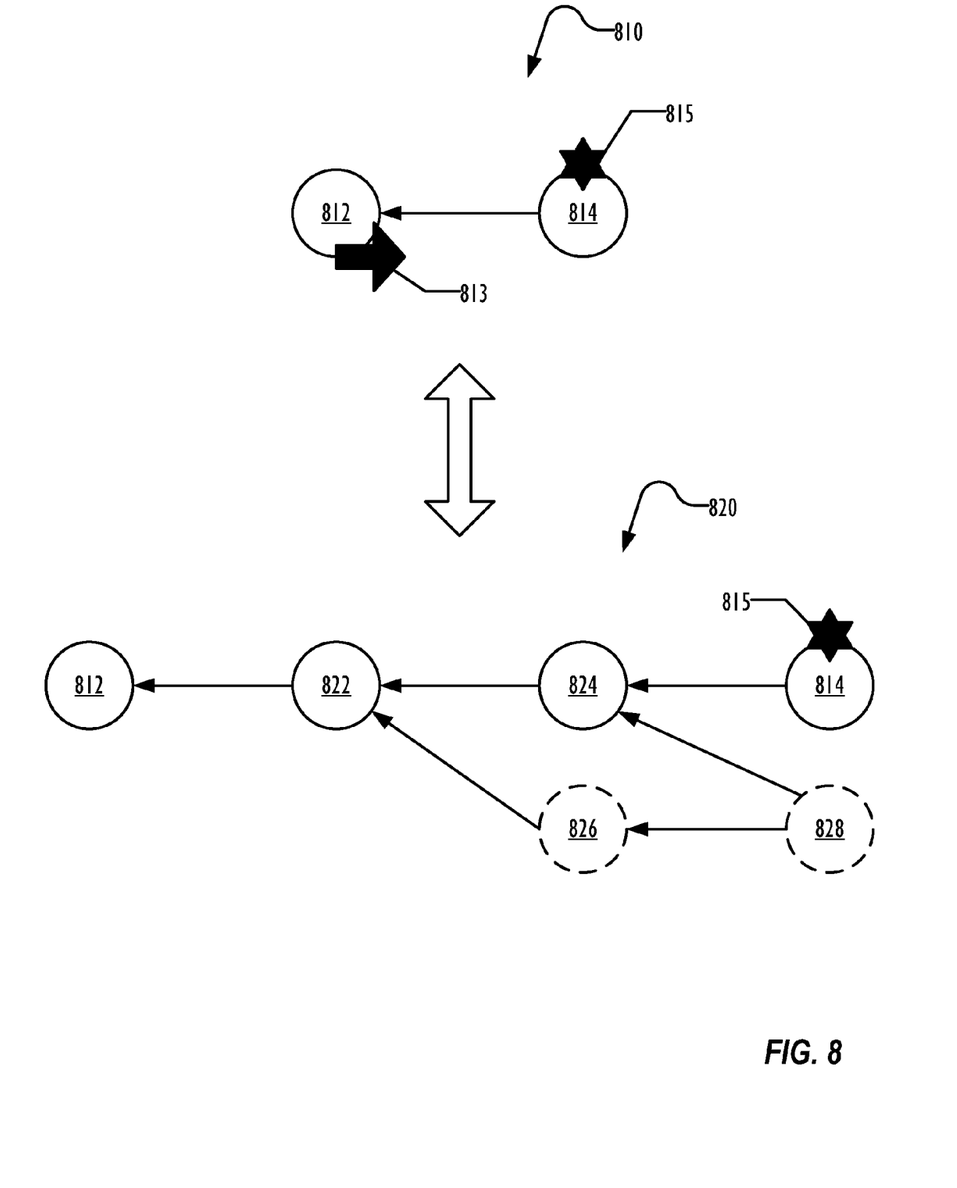

FIG. 8 is a pair of graphs 810 and 820 that illustrate collapsed and expanded states according to one embodiment showing that the service model is not limited to a true tree form graph, but may be a DAG with some nodes having multiple parents. In this example, collapsed form graph 810 shows root node 812 with an expansion indicator 813, and a leaf node 814 with an impact indicator 815. Upon expanding the smart view of graph 810, the expanded graph shows additional nodes 822, 824, 826, and 828. Nodes 826 and 828 represent service components that are in an OK state, so they can be hidden during the collapse into graph 810. Node 828 has two parent nodes: node 824, which inherits state from impacted node 814; and node 826, which inherits state from OK state node 828. Because nodes 826 and 828 are in the OK state, the collapsed graph 810 does not need to preserve a visual representation of that subgraph, even though nodes 822 and 824 thus have children in two different states. As with the graphs of FIG. 4, in some embodiments an intermediate graph (not shown in FIG. 8) may be available that shows that the subgraph of nodes 826 and 828 can be expanded from either or both of nodes 822 and 824 if desired.

Figure 9:
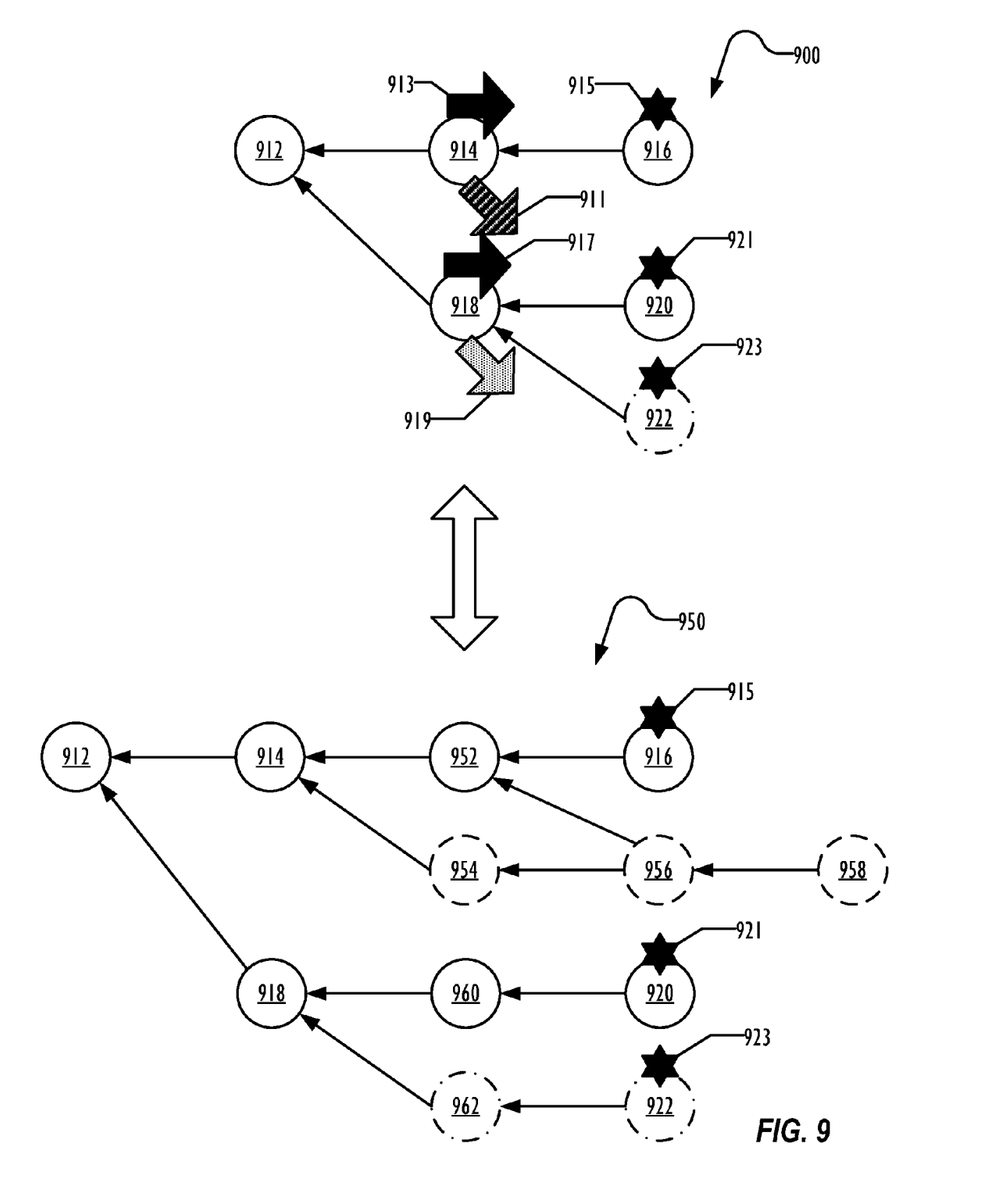

FIG. 9 combines some of the previously described elements into a single pair of graphs 900 and 950 according to one embodiment. Collapsed graph 900 shows a root node 912 that has two child nodes 914 and 918. Node 914 itself has a child node 916 that has an impacting event indicator 915.

Node 918 has two child nodes 920 and 922 that represent two different impacting events, as indicated by the line pattern of the circles in FIG. 9, and which bear impacting event indicators 921 and 923, respectively.

Node 914 bears two expansion indicators 911 and 913. Expansion indicator 911 has a fill pattern that indicates a subgraph of nodes in the OK state was collapsed into node 914. As seen in graph 950, these are nodes 954, 956, and 958, where node 956 descends from both nodes 954 and node 952. Expansion indicator 913 indicates that a subgraph of nodes not in the OK state was collapsed between nodes 914 and 916, which graph 950 shows to be node 952.

Node 918 also bears two expansion indicators 917 and 919, which indicate that two subgraphs of two different impacting event types have been collapsed into node 918, between nodes 918 and 920 and between nodes 918 and 922. Upon expanding the subgraph indicated by expansion indicator 917, node 960 is revealed in graph 950. Upon expanding the subgraph indicated by expansion indicator 919, node 962 is revealed in graph 950. In some embodiments, any of the expansion indicators 911, 913, 917, and 919 may be separately triggered to expand the relevant collapsed subgraph if desired for a more detailed view of the service model. As illustrated in FIG. 4, expansion of the subgraph indicated by expansion indicator 913 may allow for an intermediate graph (not shown in FIG. 9) that indicates further expansion of node 952 is available to see nodes 956 and 958, which are descendants of node 952.

Figure 10:
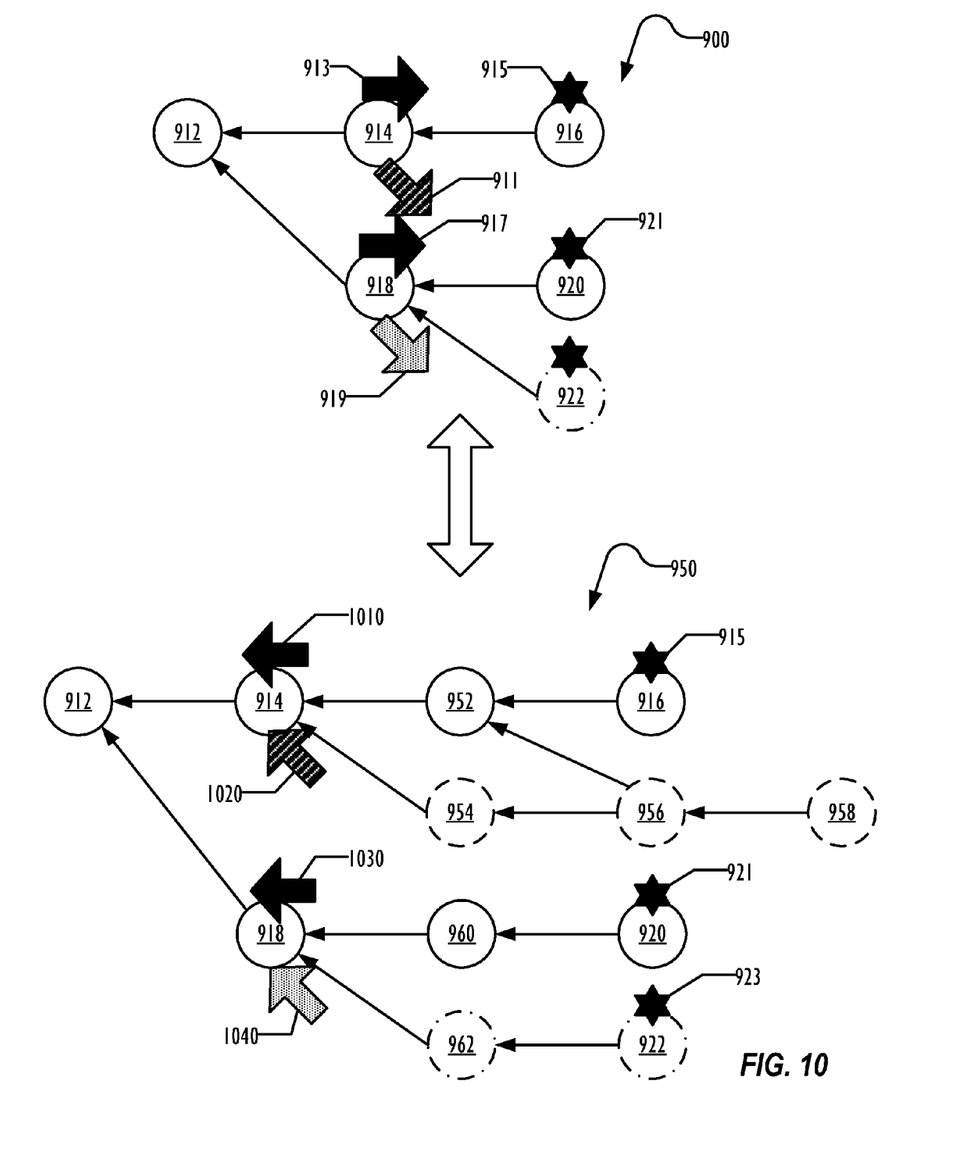

In one embodiment, the default view of the service model may provide a fully collapsed graph. In another embodiment, the default view of the service model may provide a fully expanded graph. In such an embodiment, illustrated in FIG. 10, collapse indicators may be placed into the graph to indicate places where a smart collapse of a subgraph may be performed. Thus, in graph 950 as illustrated in FIG. 10, collapse indicators have been added to the graph as illustrated in FIG. 9. Collapse indicator 1010 indicates that a subgraph (in FIG. 10, node 952) may be collapsed. Collapse indicator 1020 indicates that the subgraph of nodes 954, 956, and 958 can be collapsed into node 914 if desired. Collapse indicator 1030 indicates that node 960 can be expanded from node 918, and collapse indicator 1040 indicates that node 962 can be expanded from node 918.

In one embodiment, instead of a collapsing indicator being placed on the root of the subgraph to be collapsed, the collapsing indicator may be placed on all collapsible nodes of the expanded graph 950. Thus, for example, in such an embodiment nodes 952, 954, 956, 958, 960, and 962 would each have a collapsing indicator. In another embodiment, instead of collapsing indicators being placed on the root or all collapsible nodes of the subgraph, a collapsing indicator may be placed on the leaf node of a collapsible subgraph. Thus, for example, in such an embodiment the collapse indicators 1030 and 1040 may be placed on node 918, indicating collapse of those two branches of the graph 950 may be performed.

Figure 11:
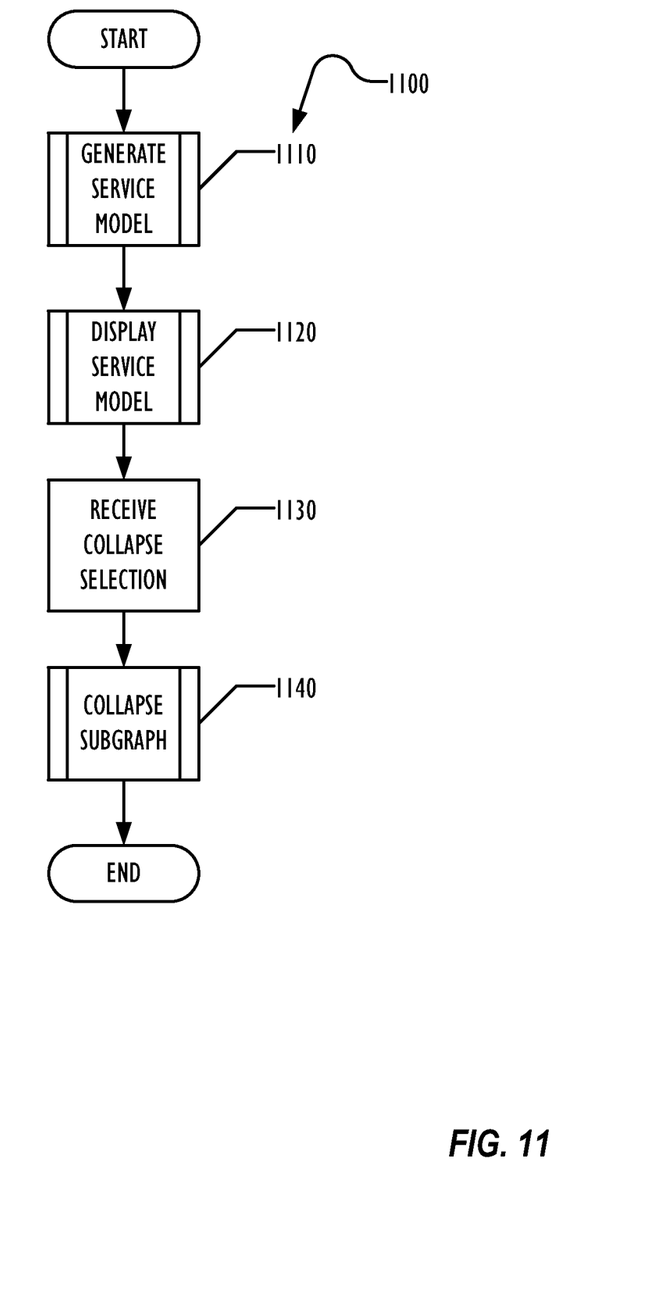
FIG. 11 illustrates, in flowchart form, an example technique for collapsing a portion of a service model according to one embodiment.

FIG. 11 is a flowchart illustrating a technique for collapsing a selected portion of a service model according to one embodiment. In 1110, the service model is generated on a computer system from data representing the service components modeled by the service model. In 1120, the service model is displayed as a DAG in a UI on a computer system, which may be a different computer system than the one generating the service model. In 1130, a selection is received from a user, selecting a portion of the graph to be collapsed. This may be by detecting a mouse click on a collapse indicator or through any use user interaction event technique known to the art. In 1140, the selected subgraph is collapsed, as described below.

Figure 12:
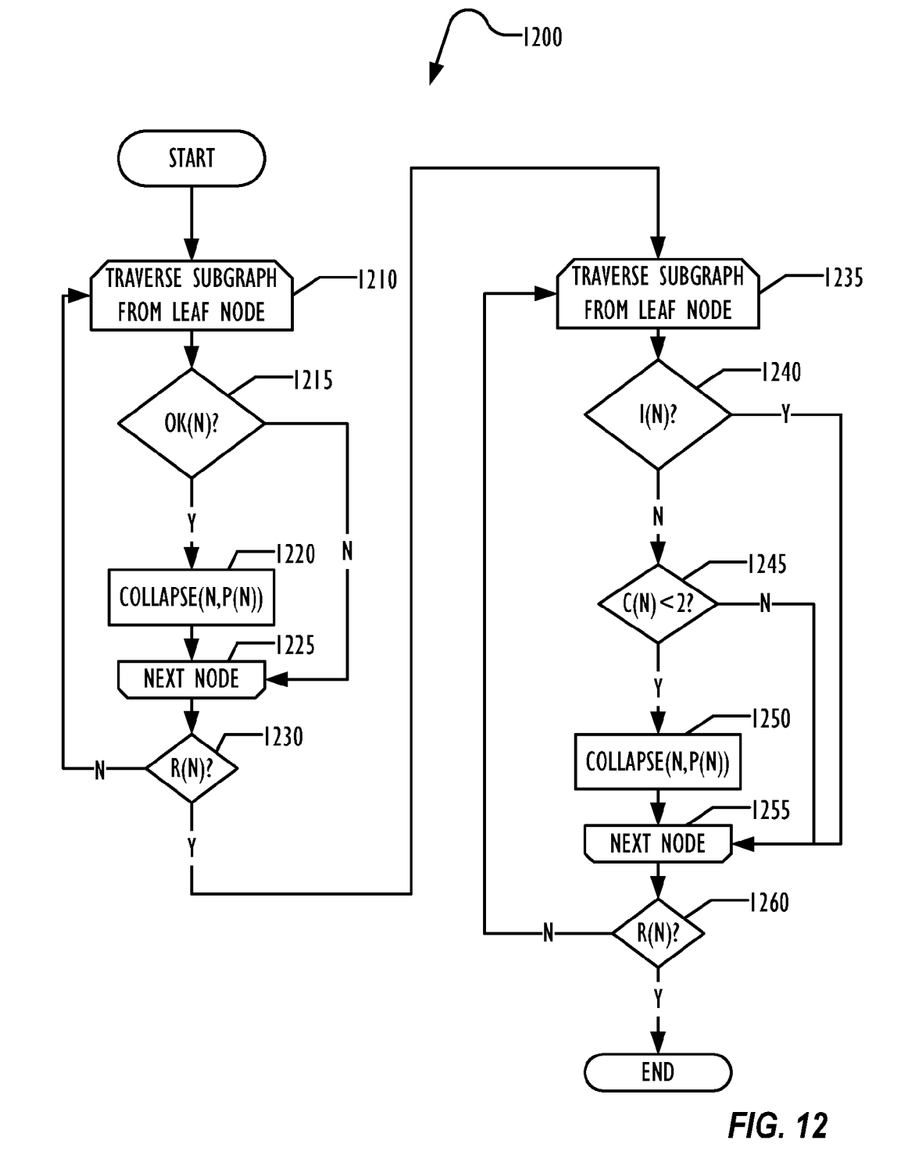
FIG. 12 illustrates, in flowchart form, an example technique for collapsing a subgraph selected for collapse according to one embodiment.

FIG. 12 is a flowchart illustrating an example technique 1200 for collapsing a subgraph according to one embodiment. First, all of the nodes in an OK state are collapsed into their parent node. In 1210, the subgraph is traversed beginning at a leaf node. In 1215, the node is checked to determine if it is in an OK state. If the current node is in the OK state, then in 1220 the current node may be collapsed into its parent, and traverse to the next node in 1225. If the next node is the root of the subgraph (1230), then the second part of the technique is performed.

When a node is collapsed into its parent in 1220, the node is no longer visible in the graph, but information may be stored to allow re-expansion of the subgraph when indicated by a user of the service model. Furthermore, whenever a node has children that are collapsed into that node, and the node remains visible in the graph, then an expansion indicator may be associated with that node. This expansion indicator may be associated with a node that will be collapsed in the second part of the technique, for example node 422 in the intermediate graph 420 in FIG. 4.

In the second part, the graph may again be traversed (1235), having collapsed all of the nodes in an OK state. Thus, all of the nodes to be examined in the second part are nodes associated with an impacting event or the ancestor of such a node. If the node is indicated as being associated with an impacting event (1240), then the node may not be collapsed, and the traversal may move to the next node in 1255. In 1245, the number of children of the node is determined. If the node has two or more children, then the node may not be collapsed and the technique proceeds on to the next node in 1255. If not, in 1250 the current node may be collapsed into its parent. In 1255, the next node in the traversal may be selected. If the node is the root of the subgraph (1260), the subgraph is fully collapsed. Otherwise, repeat the above technique for the next node.

In an embodiment where the service model is displayed in a collapsed state initially, including an embodiment where the initial state is controlled by an option, the actions of FIG. 12 may be performed for the entire service model graph prior to the initial display, instead of as a result of a user selecting a specific subgraph to be collapsed from an expanded view.

When a node is collapsed into its parent in 1250, information may be stored to allow re-expansion of the subgraph when indicated by a user of the service model. Furthermore, whenever a node has children that are collapsed into that node, and the node remains visible in the graph, then an expansion indicator may be associated with that node.

In an embodiment where the service model is displayed in an expanded state initially, the technique of FIG. 12 may be performed on the entire service model graph prior to the initial display to determine what collapses may be performed, without actually performing the collapses, and placing collapse indicators to indicate where the service model graph may be collapsed.

Furthermore, as impact events occur or as service components go from an impacted state to an OK state, then the technique of FIG. 12 may need to be repeated, to update the displayed collapsed or expanded graph. For example, if new impact events occur, then a collapsed graph may need to be expanded and collapsed again to account for new nodes that were hidden that need to be displayed. Similarly, if impact events are cleared, returning a node to an OK state, nodes that were displayed that may be hidden.

Any number of impacting events may be provided for in the service model represented by these graphs. In some embodiments, the service model may predefine certain impacting events. In some embodiments, users may define their own impacting event conditions, instead of or in addition to any predefined impacting events, providing that definition to the computer system processing the service model. Furthermore, the term impacting event should be understood to include any condition that may be considered of value to indicate in the representation of the service model. Generally, an impacting event is any event or condition, where the occurrence of the event may impact the services provided by the enterprise under the service model represented by the graph. For example, it may indicate the failure of a hardware element, such as a server computer, or an interruption in a software service, such as a termination of a program performing some service. These events may be planned or unplanned. The impacting event may represent a past condition, such as when the service model is displaying a record of historical events, a present condition, such as a device that is currently in a failed state, or a future one, such as a planned outage of a service. An impacting event may be defined to depend upon other impacting events by defining it as a synthetic condition derived from other events or conditions. Some examples include, but are not limited to, nodes where a service impacting node correlation coefficient exists within a predetermined range, nodes meeting a threshold amount of an event, and nodes impacted by events of a certain state.

In some embodiments, impacting events may be ranked. In embodiments, impacting events may be unranked. In the latter type of embodiments, nodes may have visual indicators of multiple states inherited from child nodes with different impacting events.

Although the above has been expressed in terms of visual displays in a user interface with visual indicators, other types of indicators, including without limitation auditory indicators may be used as desired.

Although the above description and the Figures illustrate the presence of collapse and expansion indicators with the nodes of the graph, the indicators may be placed in the graph in any desired manner. In some embodiments, the collapse and expansion indicators may be shown with the connectors or edges of the graph, instead of with the nodes of the graph.

The above description is written in terms of embodiments in which information about collapsed nodes is associated with the parent of the collapsed node or with an expansion indicator associated with that parent. In other embodiments, the information about collapsed nodes may be associated with the child of the collapsed node, instead of its parent.

The above description discloses several embodiments that allow the retention of important service context information and relations in a graph modeling the information technology of an enterprise, allowing end users to collapse and expand multi-node subgraphs of the graph in a single interaction, instead of node by node. A multi-node subgraph of nodes that are in an "OK" state may collapsed into a root of the subgraph. To preserve information, in some embodiments any node associated with an impacting event may not be collapsed into its parent and a node with multiple children associated with impacting events may not be collapsed into its parent. Indicators in some embodiments provide information for end users regarding where collapsed subgraphs may be expanded, and where expanded subgraphs may be collapsed. In some embodiments, users may define criteria for impacting events that may be associated with nodes. In some embodiments, predefined criteria may be provided for impacting events.

Various changes in the graphical, as well as in the details of the illustrated operational methods are possible without departing from the scope of the following claims. For instance, the illustrative expanding and collapsing techniques may perform the identified collapsing or expanding steps in an order different from that disclosed here. Alternatively, some embodiments may combine the activities described herein as being separate steps. Similarly, one or more of the described steps may be omitted, depending upon the specific operational environment in which the method is being implemented. In one embodiment, a technique may precalculate the node depth and process the nodes using a breadth first scan starting from a deepest known node in the DAG.

In addition, acts in accordance with the methods of this disclosure may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method, comprising:
   generating a graph in a first computer system, wherein nodes of the graph represent information technology (IT) components of an enterprise;
   collapsing a multi-node subgraph of the graph, comprising:
      collapsing nodes of the subgraph that represent IT components that are in a first state, the first state having no associated impacting event;
      collapsing nodes of the subgraph that meet a first criterion, the first criterion being based on at least one of a state of a single child node in the multi-node subgraph with an associated impacting event and a ranked impacting event; and
      associating expansion indicators with nodes in the collapsed subgraph to indicate where the collapsed subgraph may be expanded, the expansion indicators further indicate a highest ranked impacting event associated with a collapsed child node; and
   displaying the graph.

2. The method of claim 1, wherein the act of collapsing a multi-node subgraph is optionally performed prior to an initial display of the graph.

3. The method of claim 1, further comprising:
receiving a request to collapse the multi-node subgraph, wherein the act of collapsing a multi-node subgraph is performed responsive to the request.

4. The method of claim 1, further comprising:
expanding the collapsed multi-node subgraph to include nodes that were collapsed by the performance of the act of collapsing a multi-node subgraph of the graph.

5. The method of claim 1, wherein nodes that are collapsed are removed from a visible display of the graph.

6. The method of claim 1, further comprising:
predetermining which nodes would be collapsed by the act of collapsing a multi-node subgraph of the graph; and
associating collapse indicators with nodes in the multi-node subgraph to indicate where the multi-node subgraph may be collapsed.

7. The method of claim 1, wherein the act of collapsing nodes of the subgraph that represent IT components that are in a first state comprises:
preserving a root node of the subgraph from collapse, even if it is in the first state.

8. The method of claim 1, wherein the act of collapsing a multi-node subgraph of the graph further comprises:
collapsing nodes of the subgraph that meet a second criterion.

9. The method of claim 1, wherein the act of collapsing nodes of the subgraph that meet a first criterion comprises:
preserving a root node of the subgraph from collapse, even if it meets the first criterion.

10. The method of claim 1, further comprising:
receiving a definition of the first criterion from a user of the graph.

11. The method of claim 1, wherein the act of collapsing nodes of the subgraph that meet a first criterion comprises:
preserving a first node of the subgraph from collapse if multiple paths through the subgraph to nodes that do not meet the first criterion intersect at the first node.

12. The method of claim 1, wherein the act of associating expansion indicators with nodes in the collapsed subgraph to indicate where the collapsed subgraph may be expanded comprises:
associating expansion indicators that vary, depending on state information associated with the IT components represented by nodes that are collapsed in the subgraph.

13. The method of claim 1, further comprising:
associating indicators in the graph with nodes representing IT components directly impacted by an event associated with the first criterion.

14. The method of claim 1, wherein the act of collapsing nodes of the subgraph that meet a first criterion comprises:
preserving nodes representing IT components directly impacted by an event associated with the first criterion.

15. The method of claim 1, further comprising:
receiving a request to expand the collapsed multi-node subgraph.

16. The method of claim 1, wherein the act of further comprising:
receiving a request to collapse the multi-node subgraph, wherein
the request is generated responsive to a user interaction with a collapse indicator that suggests a multi-node subgraph of the graph that may be collapsed.

17. The method of claim 1, further comprising:
repeating the act of generating a graph in a first computer system, the act of collapsing a multi-node subgraph of the graph, and the act of displaying the graph, responsive to an event affecting a component represented by a node of the graph.

18. A non-transitory computer readable medium with instructions for a programmable control device stored thereon wherein the instructions cause a programmable control device to perform the method of claim 1.

19. A networked computer system comprising:
a plurality of computers communicatively coupled, at least one of the plurality of computers programmed to perform at least a portion of the method of claim 1 wherein the entire method of claim 1 is performed collectively by the plurality of computers.

* * * * *